(12) United States Patent
Glaser et al.

(10) Patent No.: US 8,777,527 B2
(45) Date of Patent: Jul. 15, 2014

(54) DRILL PRODUCTION METHOD

(75) Inventors: Arno Glaser, Vaduz (LI); Steven Moseley, Feldkirch-Tisis (AT); Michael Bischof, Bregenz (AT)

(73) Assignee: Hilti Aktiengesellschaft, Schann (LI)

( * ) Notice: Subject to any disclaimer, the term of this patent is extended or adjusted under 35 U.S.C. 154(b) by 1019 days.

(21) Appl. No.: 12/804,353

(22) Filed: Jul. 20, 2010

(65) Prior Publication Data

US 2011/0020085 A1 Jan. 27, 2011

(30) Foreign Application Priority Data

Jul. 27, 2009 (DE) .......................... 10 2009 028 020

(51) Int. Cl.
*B23B 51/02* (2006.01)
*B25D 17/02* (2006.01)
*B22F 7/04* (2006.01)

(52) U.S. Cl.
USPC ........................................................ 408/144

(58) Field of Classification Search
USPC ........................................................ 408/144
See application file for complete search history.

(56) References Cited

U.S. PATENT DOCUMENTS

| | | | | |
|---|---|---|---|---|
| 5,228,812 A | * | 7/1993 | Noguchi et al. | 408/144 |
| 5,685,671 A | * | 11/1997 | Packer et al. | 407/54 |
| 5,971,674 A | * | 10/1999 | Holley | 408/59 |
| 2002/0057951 A1 | * | 5/2002 | Silver | 408/1 R |
| 2002/0159851 A1 | * | 10/2002 | Krenzer | 408/230 |
| 2002/0172569 A1 | * | 11/2002 | Nakamura | 408/144 |
| 2004/0208716 A1 | * | 10/2004 | Krenzer | 408/144 |
| 2005/0244236 A1 | * | 11/2005 | Bosman | 408/59 |

FOREIGN PATENT DOCUMENTS

| | | |
|---|---|---|
| AT | 49 147 B | 7/1911 |
| DE | 34 86 140 T2 | 8/1993 |
| EP | 0 132 652 B1 | 5/1993 |
| EP | 0 714 719 A1 | 6/1996 |
| EP | 1 260 338 A2 | 11/2002 |
| JP | 2005 111 581 A | 4/2005 |
| WO | WO 2008/088631 | 7/2008 |

\* cited by examiner

*Primary Examiner* — Jermie Cozart
(74) *Attorney, Agent, or Firm* — Davidson, Davidson & Kappel, LLC

(57) ABSTRACT

A drill having a drill head (11) made of hard metal and a shaft (12) or a coupling piece (16) made of a sintered iron alloy. The hard metal is joined in the form of a material connection to the sintered iron alloy by a sintering process.

7 Claims, 1 Drawing Sheet

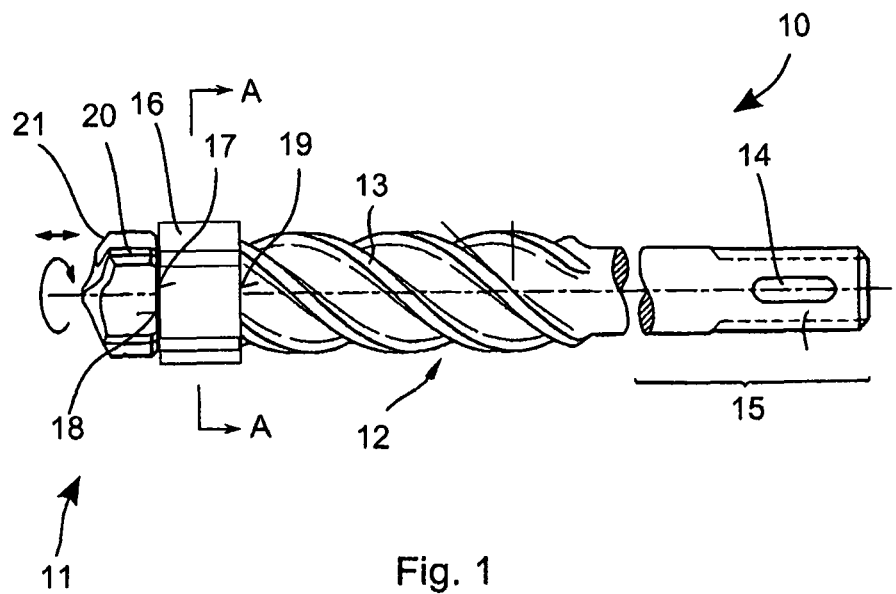
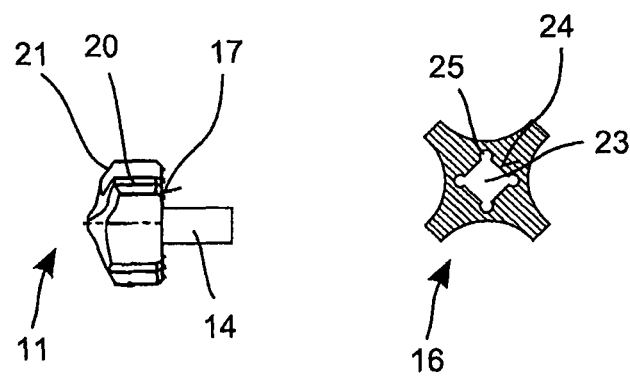 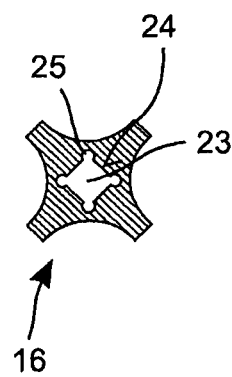
Fig. 1
Fig. 2  Fig. 3

DRILL PRODUCTION METHOD

This claims the benefit of German Patent Application DE 10 2009 028 020.0, filed Jul. 27, 2009 and hereby incorporated by reference herein.

The present invention relates to a drill, preferably having a solid head, that is especially suited for turning lathe operation. Moreover, the invention relates to a production method for a drill.

BACKGROUND

Drills for the construction sector are produced with cutting edges made of hard metal. The hard metal, typically a sintered tungsten carbide, is hard enough to cut stone and also steel reinforcement. In the case of a solid-head drill, the entire drill head is made of the hard metal. The drill head is joined to a spiral at a joining zone. The joining zone is a weak point when forces are transferred from the spiral to the drill head and also from the drill head to the spiral. In particular, the drill heads can be sheared or twisted off the spiral if the drill gets jammed in the reinforcement during drilling.

SUMMARY OF THE INVENTION

An object of the present invention includes achieving a more sturdy fastening of the solid head to the shaft of the drill.

The drill according to the invention has a drill head made of hard metal and a shaft or a coupling piece made of a sintered iron alloy. The sintered hard metal is joined integrally to the sintered iron alloy by means of a sintering process. In contrast to a weld seam, the sintered joint seam does not have a molten area. The hard metal, for instance, tungsten carbide, and the iron alloy diffuse into each other in the area of the joint seam. This gives rise to an integral material connection. The sintered iron alloy of the shaft or coupling piece typically has a residual porosity, as a result of which the sintered iron alloy has a lower density than the same material from the melt. The difference can be, for example, 1% to 5% of the density.

One embodiment provides that the shaft or the coupling piece has a depression into which the drill head is partly inserted. The drill head is clamped in the depression by means of thermomechanical tensions. The hard metal can have a coefficient of thermal expansion over the temperatures of the sintering that, on the average, is lower than that of the iron alloy around the depression of the base body or of the coupling piece. The thermomechanical tensions occur when the drill cools down after having been produced at high temperatures.

One embodiment provides that the iron alloy contains at least 45% by weight of iron, preferably at least 60% by weight. The high iron content ensures that the shaft has sufficient ductility or, in the case of the preferred use of a coupling piece, the possibility that said coupling piece can be welded onto a shaft made of steel.

One embodiment provides that the drill head has at least one journal on the bottom of the drill head that is inserted into the depression.

One embodiment provides that the drill head is formed by a cutting edge. Another embodiment provides that the drill head has at least two contiguous cutting edges.

The inventive production method for a drill provides for the following steps: producing a sintered drill head made of hard metal; producing a blank for a shaft or for a coupling piece having a joining zone; and sintering the blank for the shaft or for the coupling piece, whereby the drill head touches the blank at the joining zone, for instance, it is inserted into a depression in the area of the joining zone of the blank.

One embodiment provides that the blank for the shaft or for the coupling piece is produced by means of compression molding or injection molding.

One embodiment provides that the coupling piece is soldered or welded to the shaft.

One embodiment provides that the hard metal contains tungsten carbide and at least one metal from the group consisting of cobalt, nickel, iron, chromium and molybdenum.

One embodiment provides that the iron alloy contains between 25% by weight and 55% by weight of nickel. These iron nickel alloys exhibit very good joining properties through the sintering. It is thought that this has to do with its lower coefficient of thermal expansion, which is comparable to that of the hard metal.

One embodiment provides that the iron alloy contains up to 20% by weight of one or more elements from the group consisting of cobalt, chromium and titanium.

BRIEF DESCRIPTION OF THE DRAWINGS

The description that follows explains the invention on the basis of examples of embodiments and figures. The figures show the following:

FIG. 1: a drill;
FIG. 2: a drill head of the drill from FIG. 1; and
FIG. 3: a coupling piece of the drill from FIG. 1.

DETAILED DESCRIPTION

Unless otherwise indicated, identical or functionally equivalent elements are designated with the same reference numerals.

FIG. 1 shows an embodiment of a drill 10 that is especially suitable for turning lathe operation. The drill 10 comprises a drill head 11 and a shaft 12. The shaft 12 is essentially cylindrical and can be provided with a spiral 13 and with grooves 14 in the area of an insertion end 15.

The drill head 11 is fastened to the shaft 12 by means of a coupling piece 16. The bottom 17 of the drill head 11 is integrally joined to one side 18 of the coupling piece 16 by a diffusion zone that is produced by a sintering process. In addition, the drill head 11 can be thermodynamically joined positively and non-positively to the coupling piece 16. The shaft 12 is integrally joined, preferably soldered or welded, to another side 19 of the coupling piece 16.

FIG. 2 shows the drill head 11 without the other elements of the drill 10. This drill head 11, shown by way of an example, is provided with two cutting edges 20, 21. These two cutting edges 20, 21 intersect each at an angle between 60° and 90°. For example, a journal 22 or another protruding element can project from the bottom 17 of the drill head 11.

The drill head 11 is configured in the form of a solid head. The entire drill head 11 with the cutting edges 20, 21 and the journal 22 forms a contiguous element made of a single material, namely, hard metal. The hard metal can contain materials from the class of sintered tungsten carbide as the hard material phase. Tungsten carbide accounts for at least 70% of the total hard metal. One or more carbides from the group consisting of, for example, titanium carbide, vanadium carbide, tantalum carbide, niobium carbide, tantalum niobium carbide, molybdenum carbide, chromium carbide, zirconium carbide and hafnium carbide can be mixed with the tungsten carbide. The tungsten carbide is present in the form of particles having a diameter ranging from, for example, 0.4 µm to 15 µm, preferably larger than 0.8 µm and/or smaller than 10 µm, in a matrix consisting of a binder material made up, for instance, of cobalt, nickel. The hard material phase amounts to 70% to 98%, preferably 80% to 98%, of the total mixture. The binder material is preferably admixed in an amount between 2% and 30%, preferably 5% to 20%. The ratios of the material quantities are indicated in percentage by weight.

FIG. 3 shows the coupling piece 16 in the section A-A from FIG. 1. The cross section of the coupling piece 16 preferably matches the shape of the bottom 17 of the drill head 11. The coupling piece 16 has a depression 23 to accommodate the journal 22 with a positive connection. The cross section of the depression 23 is preferably identical to the cross section of the journal 22. As shown, the depression 23 can have a square cross section. Preferably, the side surfaces 24 of the depression 23 are oriented parallel to the cutting edges 20, 21. The side surfaces 24 can be between 20% and 59% of the width of the cutting edges 20, 21. The axially oriented edges 25 of the depression are preferably rounded off.

The coupling piece 16 is preferably made of an iron alloy that can be sintered. An example of an iron alloy that can be sintered contains between 5% and 55% nickel and at least 40% iron. The composition of the iron alloy of the coupling piece 16 is selected in such a way that the coefficient of thermal expansion of the iron alloy is greater than the coefficient of thermal expansion of the hard metal of the drill head 11.

In one embodiment, iron alloys having a low coefficient of thermal expansion are preferred. Examples of such alloys are iron-nickel alloys having a high nickel content between 32% and 55%. Instead of nickel, it is also possible to employ iron alloys to which one or more elements from the group consisting of nickel, cobalt, chromium and titanium have been added in amounts ranging from 25% to 60% in total, whereby the cobalt, chromium and titanium together amount to 35% at the maximum. One or more elements from the group consisting of niobium, vanadium, tungsten, molybdenum, silicon and aluminum can be added at a total content of up to 15% for hardening purposes. Other alloys such as, for instance, manganese, carbon, boron and selenium, are admixed at a total content of 2% at the maximum. The rest is iron.

A first iron alloy contains 32% to 52% nickel, at the most 2% of other alloy admixtures and, for the rest, iron. A second iron alloy can have a lower nickel content, for instance, 25% to 52% nickel, whereby, in addition, between 2% and 10% chromium and up to 5% titanium are admixed, while the rest is iron. A third iron alloy contains 27% to 34% nickel, at the most 20% chromium and, for the rest, iron. A fourth iron alloy contains 27% to 46% nickel, 12% to 16% chromium, at the most 8% of other alloy admixtures and, for the rest, iron. The iron content in each iron alloy is at least 46%.

The shaft 12 is made of steel. The steel is preferably non-refined or low-refined, that is to say, admixtures are added to the steel in amounts of less than 5%; in particular, the steel has a nickel content of less than 2%.

The coupling piece 16 made of iron alloy is preferably welded or soldered onto the shaft 12 made of steel. A high-quality joining zone is ensured by the high content of iron in the coupling piece 16.

The drill head 11 is produced by means of a powder-metallurgical process. Granules of a hard metal, e.g. tungsten carbide, mixed with a metallic binder material, e.g. cobalt, nickel, iron, chromium, molybdenum and an organic matrix are compression-molded. As an alternative, the mixture can be injection-molded. The organic matrix is separated out. In this stage, the product is called a blank. This blank for the drill head 11 has essentially the shape of the later drill head 11. During a heat treatment—the sintering—at temperatures of, for example, more than 900° C., the interstices close that had been left behind when the organic matrix was separated out. In this process, the blank shrinks largely isotropically.

The coupling piece 16 is likewise produced by means of a powder-metallurgical process. The iron alloy in the form of granules in an organic matrix is compression-molded. As an alternative, the mixture can be injection-molded. The organic matrix is subsequently separated out in order to produce the blank for the coupling piece 16.

The sintered drill head 11 is placed onto the blank for the coupling piece 16. In this process, the journal 22 is inserted into the depression 23. Subsequently, the blank for the coupling piece 16 is sintered. The iron alloy is sintered at high temperatures, for example, between 900° C. and 1300° C. During the sintering, the blank for the coupling piece 16 shrinks, thereby closing the hollow spaces left behind when the organic matrix was separated out. The sintered coupling piece 16 is now preferably joined with a positive connection to the sintered drill head 11. During the cooling down from the high sintering temperature, the drill head 11 and the coupling piece 16 shrink in accordance with their coefficients of thermal expansion. The coefficient of thermal expansion of the coupling piece 16, which is on the average higher, now causes the coupling piece 16 to contract more strongly than the drill head 11. As a result, the journal 22 is thermodynamically clamped into the depression of the coupling piece.

What is claimed is:

1. A production method for a drill comprising the following steps:
   producing a pre-sintered drill head made of hard metal;
   producing a blank for a shaft or for a coupling piece having a joining zone;
   sintering the blank, the pre-sintered drill head being in contact with the blank.

2. The production method as recited in claim 1 wherein the blank is produced by compression-molding or injection-molding.

3. The production method as recited in claim 1 wherein the blank is for the coupling piece, and the coupling piece is soldered or welded to the shaft.

4. The production method as recited in claim 1 wherein the hard metal contains tungsten carbide and at least one metal from the group consisting of cobalt, nickel, iron, chromium and molybdenum.

5. The production method as recited in claim 1 wherein the blank is made of an iron alloy.

6. The production method as recited in claim 5 wherein the iron alloy contains between 25% by weight and 55% by weight of nickel.

7. The production method as recited in claim 5 wherein the iron alloy contains up to 20% by weight of one or more elements from the group consisting of cobalt, chromium and titanium.

* * * * *